US006657036B1

(12) United States Patent
Jung et al.

(10) Patent No.: US 6,657,036 B1
(45) Date of Patent: Dec. 2, 2003

(54) POLYCONDENSATION RESINS AND POLYADDITION RESINS PRODUCED BY HETEROGENEOUS CATALYSIS

(75) Inventors: Werner-Alfons Jung, Ascheberg (DE); Heinz-Peter Rink, Münster (DE); Eberhard Fuchs, Frankenthal (DE); Wolfgang Straehle, Münster (DE)

(73) Assignee: BASF Coatings AG, Munster (DE)

( * ) Notice: Subject to any disclaimer, the term of this patent is extended or adjusted under 35 U.S.C. 154(b) by 0 days.

(21) Appl. No.: 09/913,602

(22) PCT Filed: Feb. 24, 2000

(86) PCT No.: PCT/EP00/01511

§ 371 (c)(1),
(2), (4) Date: Oct. 4, 2001

(87) PCT Pub. No.: WO00/50487

PCT Pub. Date: Aug. 31, 2000

(30) Foreign Application Priority Data

Feb. 24, 2000 (DE) .......................................... 199 07 861

(51) Int. Cl.$^7$ .............................................. C08G 18/22
(52) U.S. Cl. ........................... 528/55; 528/56; 528/57; 528/58; 528/80; 528/81; 528/83; 528/275; 528/276; 528/277; 528/278; 528/279; 528/280; 528/281; 528/282; 528/283; 528/284; 528/285; 528/286; 528/287; 528/293; 528/355; 528/356; 528/357; 528/358; 502/11; 526/90; 526/123.1
(58) Field of Search ................................ 528/275–287, 528/293, 355–358, 55–58, 80, 81, 83; 502/11; 526/90, 123.1

(56) References Cited

U.S. PATENT DOCUMENTS

| 3,957,753 A | * | 5/1976 | Hostettler et al. |
| 4,139,518 A | * | 2/1979 | Janocha et al. |
| 4,311,570 A | * | 1/1982 | Cowen et al. |
| 4,992,548 A | | 2/1991 | Scholl et al. ................ 544/193 |
| 6,291,624 B1 | * | 9/2001 | Ardaud et al. |

FOREIGN PATENT DOCUMENTS

| DE | 1770213 | * 12/1971 | |
| EP | 0 355 479 A1 | 7/1989 | ............ B01J/31/02 |
| GB | 1 372 854 | 11/1972 | ............ C07C/67/00 |
| GB | 1 552 018 | 11/1975 | ............ B01J/31/02 |

OTHER PUBLICATIONS

Saunders et al; Polyurethanes; 1964, p. 447.*

* cited by examiner

Primary Examiner—Rachel Gorr

(57) ABSTRACT

The invention relates to polycondensation resins which are prepared by polycondensation of compounds having a low molecular weight and separation of small molecules in the presence of at least one hetergeneous catalyst. The invention also relates to polyaddition resins which are prepared by polyaddition in the presence of at least one heterogeneous catalyst. The invention further relates to the use of said polycondensation resins and polyaddition resins for the preparation of moulded parts, adhesives and coating materials.

14 Claims, No Drawings

POLYCONDENSATION RESINS AND POLYADDITION RESINS PRODUCED BY HETEROGENEOUS CATALYSIS

The present invention relates to the use of heterogeneous catalysts in the preparation of polycondensation resins and polyaddition resins. The present invention further relates to polycondensation resins and polyaddition resins which are preparable by heterogeneous catalysis. The invention further relates to novel processes for preparing polycondensation resins and polyaddition resins. The present invention relates not least to the use of the polycondensation resins to prepare polyaddition resins.

As is known, polycondensation is a step reaction of low molecular mass compounds to give oligomers and/or polymers. The reaction rate of the polycondensation may be increased by raising the reaction temperature. However, there are limits on an arbitrary raising of the reaction temperature within fairly short intervals of time, since fairly large reactors in particular cannot be supplied with sufficient thermal energy in order to melt the reaction mixture more quickly and to condense it. Further limiting parameters are the utilizable thermal energy available, the heat transfer coefficients, the foaming induced by the distillative removal of, for example, water, or the viscosity of the polycondensate, which increases during the step reaction and makes rapid escape of, for example, water more and more difficult. Moreover, high reaction temperatures are often deleterious for the intrinsic color of the polycondensate.

It is known to increase the reaction rate of polycondensation by means of catalysts such as lithium octoate, dibutyltin oxide, dibutyltin dilaurate, stannic acid or paratoluenesulfonic acid and so to shorten the synthesis time. However, these catalysts are often unwanted in the subsequent products of the polycondensation resins. Where, for instance, the polycondensation resins are used for the preparation of polyaddition resins, these catalysts may induce unwanted secondary reactions which detract from the usefulness of the polyaddition resins. A typical example is the preparation of polyurethane prepolymers containing isocyanate groups from polyesters containing terminal hydroxyl groups (polyesterpolyols). The catalysts commonly employed also catalyze reactions of the isocyanate groups, so that numerous byproducts are produced in relatively large amounts, impairing the profile of performance properties of the polyaddition resins. Where the polycondensation resins are used directly to prepare coating materials, the catalysts may accelerate the reaction with the crosslinking agents to such a large extent that prematurely cross-linked products are formed. In the finished coating, such products manifest themselves as specks. It is therefore necessary to remove the aforementioned catalysts from the polycondensation resins, although this is not easy to do.

It is an object of the present invention to provide novel processes for the polycondensation and polyaddition of low molecular mass compounds, said processes no longer having the disadvantages of the prior art but instead permitting the reaction rate to be increased without problems using catalysts without thermal damage to the polyaddition resins or polycondensation resins formed. Moreover, the catalysts employed in the novel processes ought no longer to induce any unwanted secondary reactions in the subsequent products of the polycondensation resins and the polyaddition resins. In addition, the catalysts should be easy to remove, if required, after the step reactions.

The invention accordingly provides the novel process for preparing polycondensation resins by polycondensing low molecular mass compounds with elimination of small molecules in a reactor, characterized in that heterogeneous catalysts are used.

The invention additionally provides the novel process for preparing polyaddition resins by polyaddition in a reactor, which is likewise characterized in that heterogeneous catalysts are used.

In the text below, the novel processes for preparing polycondensation resins and polycondensation resins are referred to comprehensively for the sake of brevity as "processes of the invention".

The invention additionally provides the novel polycondensation resins and polyaddition resins which are preparable in the presence of heterogeneous catalysts.

The invention further provides novel polyaddition resins which are preparable using the polycondensation resins of the invention.

In the text below, the novel polycondensation resins are referred to as "polycondensation resins of the invention" and the novel polyaddition resins are referred to as "polyaddition resins of the invention".

In the light of the prior art it was surprising and unforeseeable for the person skilled in the art that the object on which the present invention is based could be achieved by the inventive use of heterogeneous catalysts. Still more surprising in this context was that a large number of organic and inorganic substances may be used as heterogeneous catalysts. The broad diversity of catalysts available in accordance with the invention makes it possible in an extremely advantageous and simple way to select the best catalyst for the polyaddition and polycondensation in hand. Moreover, the extremely broad diversity of forms in which the heterogeneous catalyst may be provided allows it to be adapted advantageously and simply to existing reactor geometries and to be separated simply from the reaction products. Even less foreseeable was that the advantages of the processes of the invention and of the polycondensation resins or polyaddition resins of the invention would extend fully to their subsequent products. For instance, coating materials based on the resins of the invention have a particularly advantageous profile of performance properties. The same applies to the polyaddition resins of the invention prepared using the polycondensation resins of the invention.

The first process of the invention is employed in the preparation of polycondensation resins. This is a step reaction which proceeds with the elimination of small molecules such as water, alcohols, phenols or hydrogen halides.

Examples of polycondensation resins which may be prepared by the process of the invention are polyamides, polyimides, polyesters, polycarbonates, amino resins, phenolic resins, polysulfides or urea resins, especially polyesters.

The second process of the invention is employed in the preparation of polyaddition resins. The polyaddition resins are formed in step reactions via reactive oligomers as discrete intermediates. The addition reactions take place without elimination of small molecules, frequently with displacement of hydrogen atoms. The reactive oligomers are also referred to as prepolymers. They contain functional groups that are still reactive, and in polymer synthesis participate in the final structure of the polymers.

Examples of polyaddition resins of the invention which may be prepared by the process of the invention are polyurethanes or polyureas, especially polyurethanes, such as are used in particular for the preparation of coating materials.

Examples of prepolymers which may be prepared by the process of the invention are the polyurethane prepolymers which still contain free isocyanate groups.

The essential process measure of the processes of the invention is the use of at least one heterogeneous catalyst which is substantially or completely insoluble in the reaction mixture. In the context of the present invention, the term "substantially insoluble" indicates that the reaction mixture contains only a number of dissolved fractions of the heterogeneous catalyst that is such that they do not influence the profile of properties of the polycondensation resin of the invention and of the polyaddition resin of the invention.

Heterogeneous catalysts suitable for use in accordance with the invention include, in particular, coated and uncoated, insoluble or sparingly soluble metal oxides and nonmetal oxides, salts, sulfides, selenides, tellurides, zeolites, phosphates, heteropolyacids and/or acidic or alkaline ion exchange resins.

The heterogeneous catalysts for use in accordance with the invention may have been doped with compounds from main groups 1 and 7 of the Periodic Table. Examples of suitable compounds of this kind are lithium hydroxide, sodium hydroxide, potassium hydroxide, lithium chloride, sodium chloride, potassium chloride, lithium fluoride, sodium fluoride, potassium fluoride, magnesium fluoride, calcium fluoride or barium fluoride.

In the context of the present invention, the term "Periodic Table" refers to the Periodic Table of the Elements as developed by Mendeleev and Meyer and described in numerous textbooks.

In addition, the heterogeneous catalysts for use in accordance with the invention may contain up to 50% by weight, preferably up to 40% by weight and in particular up to 30% by weight, of copper, silver, tin, zinc, manganese, rhenium, osmium, cobalt, rhodium, iridium, nickel, palladium, platinum and/or vanadium.

Examples of suitable metal oxides and nonmetal oxides are acidic, basic or amphoteric oxides of main groups 2, 3 and 4 of the Periodic Table such as calcium oxide, magnesium oxide, boron oxide, aluminum oxide, silicon dioxide, especially pyrogenic silicon dioxide, silica gel, kieselguhr and/or quartz, or tin dioxide; acidic, basic or amphoteric oxides from transition groups 2 to 6 of the Periodic Table such as titanium dioxide, especially amorphous titanium dioxide, anatase or rutile, zirconium oxide, zinc oxide, manganese oxide, vanadium oxide, niobium oxide, iron oxides, chromium oxides, molybdenum oxides or tungsten oxide; or oxides of the lanthanides or actinides such as cerium oxide, praseodymium oxide, neodymium oxide, samarium oxide, europium oxide, gadolinium oxide, terbium oxide, dysprosium oxide, holmium oxide, erbium oxide, thulium oxide, ytterbium oxide, luthetium oxide or thorium oxide; or mixed oxides of the abovementioned elements or mixtures of these oxides and/or mixed oxides.

An example of a suitable salt is sulfuric-acidic titanium dioxide.

Examples of suitable sulfides, selenides and tellurides are zinc telluride, tin selenide, molybdenum sulfide, tungsten sulfide, nickel sulfide, zinc sulfide or chromium sulfide.

Examples of suitable zeolites are ion exchangers such as alkali metal zeolites (Permutite®) or molecular sieves such as chabasite, gmelinite or erionite.

Examples of suitable phosphates are calcium phosphate or iron phosphate.

Examples of suitable heteropolyacids are the heteropolyacids formed by tungsten, molybdenum and/or vanadium polyacids with boric acid, silicic acid, phosphoric acid, arsenic acid, telluric acid or periodic acid.

Examples of suitable acidic or alkaline ion exchange resins are organic polymers containing anionic groups and/or acid groups or cationic groups and/or cation-forming groups. Examples of suitable anionic groups and acid groups are sulfonates and sulfonic acid groups, respectively. Examples of suitable cationic groups and cation-forming groups are primary, secondary, tertiary or quaternary ammonium groups and primary, secondary or tertiary amines, respectively. Examples of suitable organic polymers are perfluorinated polymers, polybenzimidazoles, polyether ketones, polysulfones, polyether sulfones or polyether ketone sulfones.

Depending on its composition, the heterogenous catalyst for use in accordance with the invention is an unsupported or supported catalyst. For example, titanium dioxide or tin dioxide may be used as titanium dioxide extrudate or tin dioxide extrudate (unsupported catalyst) or as thin coats on a support (supported catalyst). Examples of suitable supports are silica, alumina or zirconium oxide. The coats of titanium dioxide or tin dioxide may be applied, for example, by hydrolysis of titanium tetrachloride or tin tetrachloride. It is also possible to use sols containing titanium dioxide or tin dioxide.

For the process of the invention, the heterogeneous catalyst for use in accordance with the invention may be used in any of a very wide variety of forms. For example, in a suitable polycondensation reactor or polyaddition reactor, the reactor walls or other reactor components that come into contact with the reaction mixture may have a firmly adhering coating of the heterogeneous catalysts. One typical example of a suitable polycondensation reactor is described in the patent WO 97/35902.

With this variant of the processes of the invention, the heterogeneous catalyst is separated off automatically when the reaction product is discharged from the reactor.

Alternatively, the heterogeneous catalyst for use in accordance with the invention may be introduced in the form of powders, extrudates, cakes and/or meshes into the reaction mixture or is anchored fixedly or removably in baskets or meshes within the reactor. Which particular variant is chosen depends primarily on the geometry of the reactor.

Following the polycondensation or the polyaddition, the catalyst of the invention may be removed from the reaction mixture by filtration and/or by withdrawal, which is a particular advantage of the process of the invention.

The first process of the invention is especially suitable for the preparation of polyester resins. Particular advantages result if the process of the invention is used to prepare polyester resins such as are commonly used in polyester coating materials. The process of the invention is of outstanding suitability in particular for the preparation of hydroxyl-containing polyester resins (polyesterpolyols) such as may be used to prepare polyaddition resins.

As is known, polyester resins are prepared by reacting
  sulfonated or unsulfonated polycarboxylic acids or their
    esterifiable derivatives, together if desired with monocarboxylic acids, and
  polyols, together if desired with monools.

Examples of suitable polycarboxylic acids are aromatic, aliphatic and cycloaliphatic polycarboxylic acids. It is preferred to use aromatic and/or aliphatic polycarboxylic acids.

Examples of suitable aromatic polycarboxylic acids are phthalic acid, isophthalic acid, terephthalic acid, phthalic, isophthalic or terephthalic monosulfonate, or halophthalic acids, such as tetrachloro- or tetrabromo-phthalic acid, of which isophthalic acid is advantageous and is therefore used with preference.

Examples of suitable acyclic aliphatic polycarboxylic acids for use in accordance with the invention are oxalic acid, malonic acid, succinic acid, glutaric acid, adipic acid, pimelic acid, suberic acid, azelaic acid, sebacic acid, undecanedicarboxylic acid, dodecanedicarboxylic acid or dimer fatty acids of which adipic acid, glutaric acid, azelaic acid, sebacic acid and/or dimer fatty acids are advantageous and are therefore used with preference.

Examples of suitable cycloaliphatic polycarboxylic acids for use in accordance with the invention are 1,2-cyclobutanedicarboxylic acid, 1,3-cyclobutanedicarboxylic acid, 1,2-cyclopentanedicarboxylic acid, 1,3-cyclopentanedicarboxylic acid, hexahydrophthalic acid, 1,3-cyclohexanedicarboxylic acid, 1,4-cyclohexanedicarboxylic acid, 4-methylhexahydrophthalic acid, tricyclodecanedicarboxylic acid. The cycloaliphatic dicarboxylic acids may be used both in their cis and in their trans form and also as a mixture of both forms.

Also suitable in accordance with the invention are the esterifiable derivatives of the abovementioned polycarboxylic acids, such as, for example, their monoesters or polyesters with aliphatic alcohols having 1 to 4 carbon atoms or hydroxy alcohols having 1 to 4 carbon atoms. Moreover, it is also possible to use the anhydrides of the abovementioned polycarboxylic acids, where they exist.

If desired, together with the polycarboxylic acids it is also possible to use monocarboxylic acids, such as benzoic acid, tert-butylbenzoic acid, lauric acid, isononanoic acid and fatty acids of naturally occurring oils, for example. As monocarboxylic acid it is preferred to use isononanoic acid.

Examples of suitable polyols are diols and alcohols with a functionality of three and/or more, especially diols. Normally, the alcohols with a functionality of three and/or more are used alongside the diols in minor amounts in order to introduce branches into the polyester resins.

Suitable diols (a2) are ethylene glycol, 1,2- or 1,3-propanediol, 1,2-, 1,3- or 1,4-butanediol, 1,2-, 1,3-, 1,4- or 1,5-pentanediol, 1,2-, 1,3-, 1,4-, 1,5- or 1,6-hexanediol, neopentyl hydroxypivalate, neopentyl glycol, diethylene glycol, 1,2-, 1,3- or 1,4-cyclohexanediol, 1,2-, 1,3- or 1,4-cyclohexanedimethanol, trimethylpentanediol, ethylbutylpropanediol or the positionally isomeric diethyloctanediols.

Further examples of suitable diols are diols of the formula I or II:

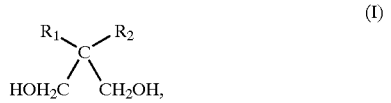

(I)

in which $R_1$ and $R_2$ are each an identical or different radical and stand for an alkyl radical having 1 to 18 carbon atoms, an aryl radical or a cycloaliphatic radical, with the proviso that $R_1$ and/or $R_2$ must not be methyl;

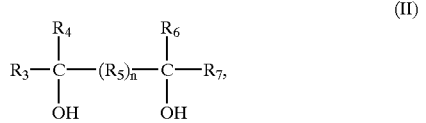

(II)

in which $R_3$, $R_4$, $R_6$ and $R_7$ are each identical or different radicals and stand for an alkyl radical having 1 to 6 carbon atoms, a cycloalkyl radical or an aryl radical and $R_5$ is an alkyl radical having 1 to 6 carbon atoms, an aryl radical or an unsaturated alkyl radical having 1 to 6 carbon atoms, and n is either 0 or 1.

Suitable diols I of the general formula I are all propanediols of the formula (a21) in which either $R_1$ or $R_2$ or $R_1$ and $R_2$ is not methyl, such as, for example, 2-butyl-2-ethyl-1,3-propanediol, 2-butyl-2-methyl-1,3-propanediol, 2-phenyl-2-methyl-1,3-propanediol, 2-propyl-2-ethyl-1,3-propanediol, 2-di-tert-butyl-1,3-propanediol, 2-butyl-2-propyl-1,3-propanediol, 1-dihydroxymethylbicyclo[2.2.1] heptane, 2,2-diethyl-1,3-propanediol, 2,2-dipropyl-1,3-propanediol or 2-cyclohexyl-2-methyl-1,3-propanediol et cetera.

As diols II of the general formula II is it possible, for example, to use 2,5-dimethyl-2,5-hexanediol, 2,5-diethyl-2,5-hexanediol, 2-ethyl-5-methyl-2,5-hexanediol, 2,4-dimethyl-2,4-pentanediol, 2,3-dimethyl-2,3-butanediol, 1,4-(2'-hydroxypropyl)benzene and 1,3-(2'-hydroxypropyl)benzene.

Of these diols, hexanediol and neopentyl glycol are particularly advantageous and are therefore used with particular preference.

Examples of suitable triols are trimethylolethane, trimethylolpropane or glycerol, especially trimethylolpropane.

Examples of suitable alcohols of higher functionality are ditrimethylolpropane, pentaerythritol, diglycerol, triglycerol, homopentaerythritol or sugar alcohols such as mannose.

If desired, minor amounts of monools may be used as well. Examples of suitable monools are alcohols or phenols such as ethanol, propanol, n-butanol, sec-butanol, tert-butanol, amyl alcohols, hexanols, fatty alcohols or phenol.

The polyester resin of the invention may be prepared in the presence of small amounts of a suitable solvent as azeotrope former. Examples of azeotrope formers used are aromatic hydrocarbons, such as particularly xylene and (cyclo)aliphatic hydrocarbons, e.g., cyclohexane or methylcyclohexane.

The second process of the invention is especially suitable for the preparation of polyaddition resins. Particular advantages result if the polyaddition resins of the invention are prepared using the polycondensation resins of the invention or polycondensation resins prepared without catalyst.

With particular advantage, the second process of the invention is employed for the preparation of polyurethanes, especially polyurethane prepolymers, which contain (potentially) ionic functional groups or none of these groups. These polyurethanes are commonly used as thermoplastics or foams or in polyurethane adhesives or polyurethane coating materials. When used in polyurethane coating materials, the polyurethanes generally contain groups which render them water dispersible, such as the (potentially) ionic groups such as sulfonic, phosphonic or carboxylic acid groups or amino groups and/or hydrophilic nonionic groups such as polyalkylene ether groups.

The polyurethane prepolymers of the invention containing isocyanate groups are prepared by reacting polyols with excess polyisocyanates at temperatures of up to 150° C., preferably from 50 to 130° C., in organic solvents which are unable to react with isocyanates. The equivalents ratio of NCO to OH groups is preferably between 2.0:1.0 and >1.0:1.0, preferably between 1.4:1 and 1.1:1.

Suitable polyols include the customary and known polyetherpolyols and polyesterpolyols, especially polyesterpolyols. In accordance with the invention it is of advantage if the polyetherpolyols and polyesterpolyols no longer contain any conventional catalysts. In the case of the polyesterpolyols, this may be achieved by preparing them without catalyst or, as described above, by the first process of the invention.

In accordance with the invention it is of advantage to use the polyesterpolyols of the invention prepared by the first process of the invention, since this results in a further shortening of the process time overall.

Alongside these polyols, it is also possible to use the above-described diols and/or triols and/or compounds containing at least two isocyanate-reactive functional groups and at least one functional group capable of forming anions or cations (potentially ionic functional groups), especially potentially anionic functional groups.

Suitable isocyanate-reactive functional groups are in particular hydroxyl groups and also primary and/or secondary amino groups, of which hydroxyl groups are advantageous and are therefore used with preference. Functional groups capable of forming anions are carboxylic acid, sulfonic acid and/or phosphonic acid groups, of which the carboxyl groups are advantageous and are therefore used with preference. It is preferred to use alkanoic acids having two substituents on the alpha carbon atom. The substituent may be a hydroxyl group, an alkyl group or an alkylol group. These polyols have at least one, generally from 1 to 3 carboxyl groups in the molecule. Examples of suitable compounds of this kind are dimethylolpropionic acid, dimethylolbutyric acid, dimethylolpropane- or dimethylolbutanephosphonic acid or -sulfonic acid, especially dimethylolpropionic acid.

Examples of suitable polyisocyanates are aromatic, acyclic aliphatic and cycloaliphatic diisocyanates. In the context of the present invention, the term "cycloaliphatic diisocyanate" refers to a diisocyanate in which at least one isocyanate group is attached to a cycloaliphatic radical.

Examples of suitable aromatic diisocyanates are tolylene diisocyanate, xylylene diisocyanate, bisphenylene diisocyanate, naphthylene diisocyanate or diphenylmethane diisocyanate.

Examples of suitable cycloaliphatic diisocyanates are isophorone diisocyanate (=5-isocyanato-1-isocyanatomethyl-1,3,3-trimethylcyclohexane), 5-isocyanato-1-(2-isocyanatoeth-1-yl)-1,3,3-trimethylcyclohexane, 5-isocyanato-1-(3-isocyanatoprop-1-yl)-1,3,3-trimethylcyclohexane, 5-isocyanato-(4-isocyanatobut-1-yl)-1,3,3-tri-methylcyclohexane, 1-isocyanato-2-(3-isocyanatoprop-1-yl)cyclohexane, 1-isocyanato-2-(3-isocyanatoeth-1-yl)-cyclohexane, 1-isocyanato-2-(4-isocyanatobut-1-yl)cyclohexane, 1,2-diisocyanatocyclobutane, 1,3-diisocyanatocyclobutane, 1,2-diisocyanatocyclopentane, 1,3-diiso-cyanatocyclopentane, 1,2-diisocyanatocyclohexane, 1,3-diisocyanatocyclohexane, 1,4-diisocyanatocyclohexane dicyclohexylmethane 2,4'-diisocyanate or dicyclohexylethane 4,4'-diisocyanate, especially isophorone diisocyanate.

Examples of suitable acyclic aliphatic diisocyanates for use in accordance with the invention are trimethylene diisocyanate, tetramethylene diisocyanate, pentamethylene diisocyanate, hexamethylene diisocyanate, ethylethylene diisocyanate, trimethylhexane diisocyanate, heptanemethylene diisocyanate or diisocyantes derived from dimer fatty acids, as sold under the commercial designation DDI 1410 by Henkel and described in the patents WO 97/49745 and WO 97/49747, especially 2-heptyl-3,4-bis(9-isocyanatononyl)-1-pentylcyclohexane, or 1,2-, 1,4- or 1,3-bis(isocyanatomethyl)cyclohexane, 1,2-, 1,4- or 1,3-bis(2-isocyanatoeth-1-yl)cyclohexane, 1,3-bis(3-isocyanatoprop-1-yl)cyclohexane or 1,2-, 1,4- or 1,3-bis(4-isocyanatobut-1-yl)cyclohexane. The latter, owing to their two isocyanate groups attached exclusively to alkyl groups, despite their cyclic groups, are counted among the acyclic aliphatic diisocyanates. Of these, hexamethylene diisocyanate is advantageous in accordance with the invention and is therefore used with particular preference.

Following their preparation, the polyurethane prepolymers of the invention have a constant isocyanate content which does not change even after prolonged storage. This is especially advantageous for purposes of operational practice, since the polyurethane prepolymer of the invention may be prepared in larger amounts, stored for a longer time and, where required, used to prepare polyurethanes and polyurethane dispersions having advantageous performance properties. The particular advantages of the process of the invention and of the polyesterpolyols of the invention therefore extend to the coating materials, coatings and films, adhesives and adhesive films, and also moldings which are produced on the basis of these polyesters, polyurethane prepolymers, polyurethanes and polyurethane dispersions.

Accordingly, these polyesters, polyurethane prepolymers, polyurethanes and polyurethane dispersions of the invention are outstandingly suitable for the production of thermoplastic and thermoset moldings and of adhesives curable physically, thermally and/or with actinic radiation and of coating materials, such as are used to produce adhesive films or in automotive OEM finishing, automotive refinish, industrial coating, including container coatings and coil coatings, or in furniture coating for producing single- or multicoat transparent and/or color and/or effect coatings, films or coated films. It should be emphasized that the desired profiles of properties can always be reproduced safely and reliably, making the inventive moldings, coating materials, coatings, films and coated films, and also adhesives and adhesive films, particularly attractive from the viewpoint of both the producer and the user.

The corresponding adhesive films, moldings, coatings and films have outstanding performance properties which can be set and reproduced safely and reliably.

EXAMPLES AND COMPARATIVE EXPERIMENTS

Examples 1 and 2 and Comparative Experiments C1 and C2

The Preparation of Inventive Polyesterpolyols by the Process of the Invention (Examples 1 and 2) and of non-inventive Polyesterpolyols by a Prior Art Process (Comparative Experiments C1 and C2)

In a 4 l stainless steel reactor suitable for polyester preparation, 446.8 g of a dimer fatty acid (Pripol 1013), 307.9 g of hexanediol, 271.5 g of neopentyl glycol, 557.9 g of isophthalic acid and 40 g of cyclohexane were weighed in and heated to 140° C. The batch was condensed until a water amount of from 170 to 180 g had been distilled off.

The yield of water was measured as a function of the reaction time. During the period of the reaction, the reactor was rendered inert by flushing with a nitrogen stream of 30 l/h. The reaction mixture was heated in such a way as to maintain a column overhead temperature of from 69 to 70° C.

In example 1, 0.19% by weight of pyrogenic silica was used as heterogeneous catalyst.

In example 2, 0.065% by weight of titanium dioxide in powder form was used as heterogeneous catalyst.

In comparative experiment C1, no catalyst was used.

In comparative experiment C2, the catalyst used was Fascat 4100 (hydrated monobutyltin oxide from Atochem).

The table gives an overview of the experimental results obtained.

TABLE

The acceleration of reaction rate of polycondensation by heterogeneous catalysts

| Examples | | | | Comparative experiments | | | |
|---|---|---|---|---|---|---|---|
| 1 | | 2 | | C1 | | C2 | |
| t (min) | H$_2$O (ml) | t (min) | H$_2$O (ml) | t (min) | H$_2$O (ml) | t (min) | H$_2$O (ml) |
| 13 | 10 | 9 | 10 | 15 | 3 | 13 | 12 |
| 42 | 23 | 23 | 16 | 34 | 7 | 39 | 24 |
| 71 | 31 | 58 | 25 | 52 | 10.5 | 71 | 35 |
| 105 | 37 | 83 | 35 | 99 | 19.5 | 111 | 51 |
| 132 | 43 | 105 | 41 | 126 | 24.5 | 147 | 67 |
| 163 | 57 | 115 | 43 | 150 | 30.5 | 177 | 85 |
| 182 | 68 | 130 | 46 | 170 | 36.5 | 216 | 111 |
| 192 | 76 | 145 | 52 | 192 | 44.5 | 247 | 139 |
| 213 | 93 | 155 | 55 | 213 | 52.5 | 286 | 159 |
| 232 | 106 | 165 | 61 | 229 | 61.5 | 303 | 167 |
| 247 | 118 | 175 | 67 | 245 | 70.5 | 333 | 178 |
| 270 | 133 | 180 | 69 | 262 | 82.5 | | |
| 288 | 146 | 199 | 86 | 266 | 83 | | |
| 297 | 152 | 225 | 103 | 314 | 102 | | |
| 321 | 161 | 243 | 116 | 368 | 130 | | |
| 497 | 173 | 261 | 132 | 419 | 136 | | |
| | | 273 | 143 | 434 | 149 | | |
| | | 288 | 155 | 501 | 158 | | |
| | | 297 | 161 | 592 | 164 | | |
| | | 340 | 177 | 708 | 170 | | |

The results of the table underline the high catalytic activity of the heterogeneous catalysts (examples 1 and 2). The polycondensation (comparative experiment C2) conducted with the conventional catalyst likewise had a considerably reduced reaction time in comparison to the uncatalyzed polycondensation (comparative experiment C1). However, the resulting polyesterpolyol C2 was unsuitable for the preparation of polyurethane prepolymers.

Examples 3 and 4 and Comparative Experiments C3 and C4

The Preparation of Polyurethane Prepolymers with Inventive Polyesterpolyols (Examples 3 and 4) and With Conventional Polyesterpolyols (Comparative Experiments C3 and C4)

In a 4 l stainless steel reactor suitable for polyurethane synthesis, 497.64 g of a 72% strength solution of a polyesterpolyol and 154.1 g of meta-tetramethyl-xylylene diisocyanate were weighed in and heated to 90° C. The resulting reaction mixture was heated until the isocyanate content was constant within the limits of from 2 to 2.5% by weight.

In example 3, the polyesterpolyol of example 1 was used. A constant isocyanate content of 2.05% by weight was reached.

In example 4, the polyesterpolyol of example 2 was used. A constant isocyanate content of 2.3% by weight was reached.

In comparative experiment C3, a polyesterpolyol prepared without catalyst was used. A constant isocyanate content of 2.04% by weight was reached.

In comparative experiment C4, the polyesterpolyol of comparative experiment C2 was used. No constant isocyanate content was reached; instead, the isocyanate content fell and fell owing to secondary reactions. Examples 3 and 4 demonstrate that the polyesterpolyols prepared by the processes of the invention are outstandingly suitable for the preparation of polyurethane prepolymers. The polyesterpolyol of comparative experiment C2, prepared using a conventional catalyst, on the other hand, was unsuitable.

Example 5 and Comparative Experiments C5 and C6

The Preparation of Polyurethane Prepolymers by the Inventive Process (Example 5) and by Conventional Processes (Comparative Experiments C5 and C6)

For comparative experiment C5, comparative experiment C3 was repeated.

For example 5 and comparative experiment C6, comparative experiment C3 was repeated except that in the case of example 5 0.16 g of titanium dioxide powder and in the case of comparative experiment C6 0.01 g of Fascat 4100 was used. In all cases it was attempted to continue the polyaddition until a constant isocyanate content had been reached. In the case of comparative experiment C5 this was the case after 7 hours, in the case of example 5, after 5 hours. This represented a significant reduction in the reaction time. In the comparative experiment C6, no constant isocyanate content was obtainable; instead, the isocyanate content fell and fell owing to secondary reactions.

What is claimed is:

1. A process for preparing polycondensation resins in a reactor comprising polycondensation reacting polycondensation reactable materials comprising low molecular mass compounds in the presence of at least one heterogeneous catalyst, wherein small molecules are eliminated, wherein the at least one heterogeneous catalyst comprises an ion exchange resin, and at least one of:
   i. the exchange resin is doped with compounds from main groups 1 and 7 of the Periodic Table, and
   ii. the heterogeneous catalyst comprising the ion exchange resin further comprises from greater than 0% up to 50% by weight of at least one of copper, silver, tin, zinc, manganese, rhenium, iron, ruthenium, osmium, cobalt, rhodium, iridium, nickel, palladium, platinum, and vanadium.

2. A process for preparing polyaddition resins in a reactor comprising polyaddition reacting polyaddition reactable materials in the presence of at least one heterogeneous catalyst, wherein the at least one heterogeneous catalyst comprises an ion exchange resin, an at least one of:
   i. the ion exchange resin is doped with compounds from main groups 1 and 7 of the Periodic Table, and
   ii. the heterogeneous catalyst comprising the ion exchange resin further comprises from greater than 0% up to 50% by weight of at least one of copper, silver, tin, zinc, manganese, rhenium, iron ruthenium, osmium, cobalt rhodium, iridium, nickel, palladium, platinum, and vanadium.

3. The process of claim 1, wherein the heterogeneous catalyst is introduced into the process by at least one of as a solid component in the reactable materials and as a coating on reactor components.

4. The process of claim 1, wherein the heterogenous catalyst is at least one of fixedly and removably anchored in the reactor.

5. The process of claim 1 further comprising removing the heterogeneous catalyst after the reaction by at least one of filtration, withdrawal from the reacted materials, and separation from the reacted materials by discharge thereof from the reactor.

6. The process of claim 1, wherein the reactor comprises at least one wall and at least one reactor component, and wherein at least a portion of at least one of the walls and the reactor components that are in contact with the reactable materials have an adhering coating of the catalyst.

7. The process of claim 2, wherein the reactor comprises at least one wall and at least one reactor component, and wherein at least one of:
   a. the heterogeneous catalyst is introduced into the process by at least one of as a solid component in the reactable materials and as a coating on the reactor components;
   b. the heterogeneous catalyst is at least one of fixedly and removably anchored in the reactor;
   c. the process further comprises removing the heterogeneous catalyst after the reaction by at least one of filtration, withdrawal from the reacted materials, and separation from the reacted materials by discharge thereof from the reactor; and
   d. at least a portion of at least one of the walls and the reactor components that are in contact with the reactable materials have an adhering coating of the catalyst.

8. The process of claim 1 further comprising preparing at least one of a thermoplastic molding, a thermoset molding, an adhesive, and a coating material from the polycondensation resins, wherein at least one of the adhesive and the coating material is curable by at least one of physically, thermally, and with actinic radiation.

9. The process of claim 2 further comprising preparing at least one of a thermoplastic molding, a thermoset molding, an adhesive, and a coating material from the polyaddition resins, wherein at least one of the adhesive and the coating material is curable by at least one of physically, thermally, and with actinic radiation.

10. A process comprising:
    a. polycondentsaion reacting low molecular mass compounds and at least one first heterogeneous catalyst in a first reactor to form a polycondensation resin; and
    b. polyaddition reacting the polycondensation resin and at least one second heterogeneous catalyst in a second reactor to form a polyaddition resin
       wherein at least one of the at least one first heterogeneous catalyst and the at least one second heterogeneous catalyst comprises an ion exchange resin, and at least one of:
          i. that ion exchange resin is doped with compounds from main groups 1 and 7 of the Periodic Table, and
          ii. that ion exchange resin is doped with compounds from greater than 0% up to 50% by weight of at least one of copper, silver, tin, zinc, manganese, rhenium, iron, ruthenium, osmium, cobalt, rhodium, iridium, nickel, palladium, platinum, and vanadium.

11. The process of claim 10, wherein at least one of:
    a. the first heterogeneous catalyst does not cause substantial secondary reactions in the polyaddition, reaction;
    b. substantially no prematurely crosslinked products are formed;
    c. substantially no specks are present in the polyaddition resin; and
    d. the first heterogeneous catalyst is not removed prior to the polyaddition reaction.

12. The process of claim 11, wherein the first reactor comprises at least one wall and at least one reactor component, and the second reactor comprises at least one wall and at least one reactor component, wherein at least one of:
    a. the first heterogeneous catalyst is introduced into the process by at least one of as a solid component in the low molecular mass compounds and as a coating on reactor components;
    b. the first heterogeneous catalyst is at least one of fixedly and removably anchored in the first reactor;
    c. the process further comprises removing the first heterogeneous catalyst after the reaction by at least one of filtration, withdrawal from the polycondensation resins, and separation from the polycondensation resins by discharge thereof from the first reactor;
    d. at least a portion of at least one of the walls and the reactor components of the first reactor that are in contact with the low molecular mass compounds have an adhering coating of the first heterogeneous catalyst;
    e. the second heterogeneous catalyst is introduced into the process by at least one of as a solid component in the polycondensation resin and as a coating on reactor components;
    f. the second heterogeneous catalyst is at least one of fixedly and removably anchored in the second reactor;
    g. the process further comprises removing the second heterogeneous catalyst after the reaction by at least one of filtration, withdrawal from the polyaddition resins, and separation from the polyaddition resins by discharge thereof from the second reactor;
    h. at least a portion of at least one of the walls and the reactor components of the second reactor that are in contact with the polycondensation resins have an adhering coating of the second heterogeneous catalyst; and
    i. the first heterogeneous catalyst and the second heterogeneous catalyst are the same.

13. The process of claim 11, wherein at least one of:
    a. the first heterogeneous catalyst comprises at least one of coated metal oxides, uncoated metal oxides, insoluble metal oxides, sparingly soluble metal oxides, coated nonmetal oxides, uncoated nonmetal oxides, insoluble nonmetal oxides, sparingly soluble nonmetal oxides, salts, sulfides, selenides, tellurides, zeolites, phosphates, heteropolyacids, acidic ion exchange resins, and alkaline ion exchange resins;
    b. the first heterogeneous catalyst has been doped with compounds from main groups 1 and 7 of the Periodic Table;
    c. the first heterogeneous catalyst comprises up to 50% by weight of at least one of copper, silver, tin, zinc, manganese, rhenium, iron, ruthenium, osmium, cobalt, rhodium, iridium, nickel, palladium, platinum, and vanadium;
    d. the second heterogeneous catalyst comprises at least one of coated metal oxides, uncoated metal oxides, insoluble metal oxides, sparingly soluble metal oxides, coated nonmetal oxides, uncoated nonmetal oxides, insoluble nonmetal oxides, sparingly soluble nonmetal oxides, salts, sulfides, selenides, tellurides, zeolites, phosphates, heteropolyacids, acidic ion exchange resins, and alkaline ion exchange resins;

e. the second heterogeneous catalyst has been doped with compounds from main groups 1 and 7 of the Periodic Table;

f. the second heterogeneous catalyst comprises up to 50% by weight of at least one of copper, silver, tin, zinc, manganese, rhenium, iron, ruthenium, osmium, cobalt, rhodium, iridium, nickel, palladium, platinum, and vanadium.

14. The process of claim 10, wherein at least one of:

a. the first heterogeneous catalyst does not cause secondary reactions in the polyaddition reaction;

b. no prematurely crosslinked products are formed; and c. no specks are present in the polyaddition resin.

* * * * *